United States Patent
Gines et al.

(10) Patent No.: US 10,033,554 B1
(45) Date of Patent: *Jul. 24, 2018

(54) SYSTEM AND METHOD OF ANALYZING CROSSTALK AND INTERSYMBOL INTERFERENCE FOR SERIAL DATA SIGNALS

(71) Applicant: Keysight Technologies, Inc., Minneapolis, MN (US)

(72) Inventors: David L. Gines, Fort Collins, CO (US); Steven Draving, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,189

(22) Filed: May 31, 2016

(51) Int. Cl.
H04B 3/32 (2006.01)
H04B 3/487 (2015.01)
H04L 25/03 (2006.01)

(52) U.S. Cl.
CPC ......... H04L 25/03006 (2013.01); H04B 3/32 (2013.01); H04B 3/487 (2015.01)

(58) Field of Classification Search
CPC ... H04L 25/00; H04L 25/03006; H04L 1/205; H04L 43/08; H04L 43/50; H03B 3/487; H04B 3/32; H04B 3/487; H04M 3/34; H04J 1/12; G01R 31/31709; G06F 11/24
See application file for complete search history.

(56) References Cited

U.S. PATENT DOCUMENTS

| 6,128,769 | A | 10/2000 | Carlson et al. |
|---|---|---|---|
| 7,194,379 | B1* | 3/2007 | Chivers ................. G04F 10/005 702/176 |
| 7,388,937 | B1 | 6/2008 | Rodger et al. |
| 2005/0030884 | A1* | 2/2005 | Kim .......................... H04B 3/23 370/201 |
| 2005/0053229 | A1 | 3/2005 | Tsatsanis et al. |
| 2005/0163207 | A1 | 6/2005 | Buckwalter et al. |

(Continued)

OTHER PUBLICATIONS

Co-pending U.S. Appl. No. 15/183,772, filed Jun. 15, 2016.

(Continued)

Primary Examiner — Sophia Vlahos

(57) ABSTRACT

A measurement instrument and associated method: receive at a first input an aggressor signal (e.g., a supply voltage) from a device under test (DUT); capture samples of the received supply voltage; receive at a second input a victim signal from the DUT, wherein the received victim signal includes a crosstalk voltage induced thereon from the supply voltage; capturing samples of the received victim signal; applying the captured samples of the received supply voltage and the received victim signal to a predetermined model which represents crosstalk voltage induced onto the received victim signal from the supply voltage waveform, to produce a system of equations, wherein the model includes a plurality of unknown parameters; ascertain the plurality of unknown parameters in the predetermined model from the system of equations; and apply the predetermined model with the ascertained parameters to the captured samples of the received supply voltage to estimate the crosstalk voltage.

20 Claims, 7 Drawing Sheets

(56) References Cited

U.S. PATENT DOCUMENTS

| | | |
|---|---|---|
| 2006/0039551 A1 | 2/2006 | Hossain |
| 2006/0195805 A1 | 8/2006 | Matsumiya |
| 2007/0064923 A1 | 3/2007 | Schmukler et al. |
| 2008/0024331 A1* | 1/2008 | Jang .................. H04L 25/0264 341/51 |
| 2011/0235759 A1 | 9/2011 | Pierrugues et al. |
| 2014/0098908 A1* | 4/2014 | Rangachari .......... H04L 25/061 375/319 |
| 2015/0162952 A1 | 6/2015 | Hollis |
| 2016/0277068 A1* | 9/2016 | Heinikoski .......... H04B 1/0475 |

OTHER PUBLICATIONS

Co-pending U.S. Appl. No. 15/159,786, dated May 19, 2016.
Notice of Allowance dated Feb. 22, 2017 in co-pending U.S. Appl. No. 15/183,772, 18 pages.
Office Action dated Dec. 29, 2017 in co-pending U.S. Appl. No. 15/159,786, 17 pages [Office Action only].

* cited by examiner

SYSTEM AND METHOD OF ANALYZING CROSSTALK AND INTERSYMBOL INTERFERENCE FOR SERIAL DATA SIGNALS

BACKGROUND

In many systems and devices, especially, for example, devices and systems which include high speed digital communication circuits, intersymbol interference and crosstalk interference between various electrical signals can be significant problems—and difficult ones to understand and diagnose.

Commonly, crosstalk interference may be produced by two signal lines coupling energy onto each other (e.g., two parallel lines radiating their signals onto each other). In general, herein, we refer to the signal which generates the crosstalk interference as an "interfering signal" or "aggressor signal," and the signal which experiences the crosstalk interference as a "victim signal." Of course when two signals produce mutual crosstalk interference, each signal may be both an aggressor signal in one case, and a victim signal in the other case.

Intersymbol interference (ISI), on the other hand, is caused by "aggressor bits" distorting other "victim bits" within the same serial data signal.

The ability to measure the magnitude of ISI and crosstalk for a particular serial data signal can be helpful to diagnosing and minimizing the crosstalk.

The analysis and diagnosis of crosstalk in a given device may be difficult and complicated.

For example, circuit simulation may be employed to analyze and diagnose crosstalk for one or more signal lines of a particular device. Given a circuit model of the particular device, software simulation tools may be employed to estimate the amount of crosstalk for a given signal line.

However, such circuit simulation has drawbacks. For one thing, the simulation results will only be as good as the circuit model. Producing accurate circuit models can be difficult and time-consuming as many circuits are complicated and have a large number of components. And if an accurate circuit model is produced, every time that a change is made to the device which is being analyzed, the circuit model must be updated. Furthermore, running the simulations can also require a lot of effort and can be time consuming. Moreover, it can be very difficult to produce an accurate simulation since in many cases the crosstalk may be created or affected by non-linearities and parasitic impedances in the circuit, which—unlike nominal circuit values—are typically not known in advance and may be difficult to ascertain. Because of this, crosstalk performance may vary significantly from individual device to individual device even when the devices are designed to be identical. Furthermore, in some cases (e.g., voltage-dependent power supply crosstalk) the model must be non-linear (voltage dependent) to accurately reflect the underlying crosstalk mechanisms. So, the accuracy of crosstalk estimates produced from circuit modeling and simulation is an issue.

One improvement for analyzing and diagnosing crosstalk for a device is to use actual measurements of a sample of the device to construct a circuit model, rather than constructing the circuit model from circuit diagrams or schematics. For example, to construct a circuit model for analyzing power supply crosstalk, one may disconnect the power supply from the rest of the device under test and replace it with an external supply which can be controlled to artificially generate a range of disturbance(s), and then measure the corresponding effect on the signal line(s) of interest as a function of the disturbance(s) across an expected range of interest. While this approach may potentially yield more accurate results, it can be tedious, invasive, time consuming, and require a lot of very expensive equipment.

As indicated above, in addition to crosstalk between signals (e.g., serial data signals) in a given device, power supplies can also create crosstalk interference to signals. In many cases, power supply crosstalk interference onto a victim signal can be just as important or more important to understand and diagnose as crosstalk interference between two signal lines. One reason for this is that different mechanisms and affects may pertain to power supply crosstalk as compared to crosstalk interference between two signal lines. For example, the amplitude noise that a supply voltage may add to a victim signal may be non-linear or voltage dependent. In particular, a positive supply voltage may be connected directly to the transmission line for a victim signal when the signal's level is at a "high value" (e.g., logic 1), so noise or voltage drift in the supply voltage may transfer directly to the victim signal. However the same interference may occur at a significantly reduced level when the victim signal's level is at a "low value" (e.g., logic 0). The opposite may be the case for negative supply voltages and ground, which may have more of an impact on a victim signal when the signal's level is low than when it is high.

Accordingly, the analysis and diagnosis of voltage-dependent power supply crosstalk in a given device may be particularly difficult and complicated.

It would also be desirable to provide a technique for analyzing and diagnosing ISI and crosstalk for a serial data signal of a device under test from one or more other signals. It would also be desirable to provide a technique for analyzing and diagnosing voltage-dependent power supply crosstalk in a device under test.

SUMMARY

A method comprises: a measurement instrument receiving at a first input thereof an aggressor signal from a device under test (DUT); the measurement instrument receiving at a second input thereof from the DUT a victim signal, wherein the received victim signal includes a crosstalk voltage induced thereon from the aggressor signal; extracting from the victim signal an ideal data pattern for the received victim signal, where the ideal data pattern does not include intersymbol interference (ISI) and does not include the crosstalk voltage; ascertaining coefficients for an ISI filter function which transforms the ideal data pattern for the received victim signal into a hypothetical victim signal where the hypothetical victim signal includes the ISI but not the crosstalk voltage, wherein the ascertained coefficients provide the hypothetical victim signal with a best-fit for the received victim signal; subtracting the hypothetical victim signal from the received victim signal to produce a residual error signal; and ascertaining coefficients for a crosstalk interference filter function which transforms the received aggressor signal into a crosstalk signal, wherein the determined coefficients provide the crosstalk signal with a best-fit for the residual error signal.

In some embodiments, when the aggressor is a serial data signal, the method further comprises extracting from the aggressor signal an ideal data pattern for the received aggressor signal, where the ideal data pattern does not include intersymbol interference (ISI) and does not include any received crosstalk voltage of its own.

In some versions of these embodiments, the method further comprises applying the crosstalk interference filter function with the ascertained coefficients thereof to the ideal data pattern of the aggressor signal to estimate crosstalk voltage induced onto the victim signal from the aggressor signal.

In some versions of these embodiments, the method further comprises: removing from the victim signal at least one of: (1) the ISI, and (2) the estimated crosstalk voltage induced onto the victim signal from the aggressor signal; and displaying on a display device the victim signal with the at least one of: (1) the ISI, and (2) the estimated crosstalk voltage removed.

A method comprises: a measurement instrument receiving from a device under test (DUT) an aggressor signal (e.g., a serial data signal or supply voltage) at a first input thereof; the measurement instrument capturing samples of the received aggressor signal; the measurement instrument receiving at a second input thereof from the DUT a victim signal, wherein the received victim signal includes a crosstalk voltage induced thereon from the aggressor signal; the measurement instrument capturing samples of the received victim signal; applying the captured samples of the received aggressor signal and the received victim signal to a predetermined model which represents crosstalk voltage induced onto the received victim signal from the aggressor signal, to produce a system of equations, wherein the model includes a plurality of unknown parameters; and ascertaining the plurality of unknown parameters in the predetermined model from the system of equations.

In some embodiments, the method further comprises: applying the predetermined model with the ascertained parameters to the captured samples of the received aggressor signal to estimate the crosstalk voltage.

In some embodiments, the method further comprises: extracting from the received aggressor signal an ideal data pattern for the received aggressor signal; and applying the predetermined model with the ascertained parameters to the ideal data pattern of the received aggressor signal to estimate the crosstalk voltage.

In some versions of these embodiments, the method further comprises: removing from the victim signal the estimated crosstalk voltage induced onto the victim signal from the aggressor signal; and displaying on a display device the victim signal with the estimated crosstalk voltage removed.

In some embodiments, the method further comprises: recovering a clock for the victim signal from the captured samples of the received victim signal; ascertaining intersymbol interference (ISI) in the received victim signal; and ascertaining the unknown parameters of the predetermined model from the captured samples of the received victim signal, the captured samples of the received aggressor signal, and the ISI in the received victim signal.

In some embodiments, the method further comprises: recovering a clock for the victim signal from the captured samples of the received victim signal; extracting from the received victim signal an ideal data pattern for the received victim signal; ascertaining intersymbol interference (ISI) in the received victim signal; recovering a clock for the aggressor signal from the captured samples of the received aggressor signal; extracting from the received aggressor signal an ideal data pattern for the received aggressor signal; and ascertaining the unknown parameters of the predetermined model from the ideal data pattern of the received victim signal, and the ideal data pattern of the aggressor signal.

In some versions of these embodiments, the model may be: $M_v = h_v * I_v + h_a * M_A$, where $I_v$ is a vector representing the victim signal with no ISI and no crosstalk voltage, $I_A$ is a vector representing the received aggressor signal, $h_v$ is an ISI filter function, and $h_a$ is a crosstalk filter function.

In some versions of these embodiments, the model may be: $M_v = h_v * I_v + h_a * I_A$, where $I_v$ is a vector representing the victim signal with no ISI and no crosstalk voltage, $I_A$ is a vector representing a serial data aggressor signal with no ISI and no crosstalk voltage, $h_v$ is an ISI filter function, and $h_a$ is a crosstalk filter function.

In some versions of these embodiments, the model may be: $M_v = h_v * [I_v + (h_a^H*(M_A-k)) \cdot Z^H + (h_a^L*(M_A-k)) \cdot Z^L]$, where: $I_v$ is a vector representing the victim signal with no ISI and no crosstalk voltage from the received supply voltage; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the captured samples of the received supply voltage; $M_V$ is a vector which represents the captured samples of the received victim signal; and k is a constant In some embodiments, the model may be: $M_v = h_v * I_v + h_a^H * (h_v*(M_A \cdot Z^H)) - k^H(h_v*Z^H) + h_a^L*(h_v*(M_A \cdot Z^L)) - k^L(h_v*Z^L)$, where: $I_v$ is a vector representing the victim signal with no ISI and no crosstalk voltage from the received supply voltage; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the captured samples of the received supply voltage; $M_V$ is a vector which represents the captured samples of the received victim signal; and $k^H$ and $k^L$ are constants.

In some versions of these embodiments, the unknown parameters include coefficients in the ISI filter function and in the crosstalk filter function.

In some versions of these embodiments, the unknown parameters include coefficients in the ISI filter function and in the crosstalk filter functions for high data bits and for low data bits.

In some versions of these embodiments, ascertaining the plurality of unknown parameters in the predetermined model from the system of equations includes: ascertaining the ISI in the received victim signal; and after ascertaining the ISI in the received victim signal, subsequently ascertaining the coefficients of the crosstalk filter function by applying the captured samples of the received aggressor signal and the received victim signal to the predetermined model using the ascertained ISI.

In some versions of these embodiments, ascertaining the ISI in the received victim signal includes: causing the victim signal to comprise a repeating data pattern such that the captured samples of the received victim signal include a plurality of instances of the data pattern; ascertaining an average vector of average captured samples of the received victim signal over the plurality of instances of the data pattern for each sample point in the data pattern; and ascertaining the ISI in the received victim signal from the average vector and the data pattern.

In some versions of these embodiments, ascertaining the ISI in the received victim signal includes: ascertaining the coefficients of the ISI filter function by solving a set of linear equations wherein the captured samples of the received victim signal are set equal to a convolution of the ISI filter function and the vector representing the victim signal with no ISI and no crosstalk voltage from the received supply voltage waveform.

In some embodiments, the method further comprises eliminating a skew between the captured samples of the received supply voltage waveform and the captured samples of the received victim signal before applying the captured samples of the received supply voltage waveform and the captured samples of the received victim signal to the predetermined model.

A measurement instrument comprises: a first input configured to receive from a device under test (DUT) an aggressor signal (e.g., a supply voltage) at a first input thereof; a first sampler configured to capture samples of the received aggressor signal; a second input configured to receive from the DUT a victim signal, wherein the received victim signal includes a crosstalk voltage induced thereon from the aggressor signal; a second sampler configured to capture samples of the received victim signal; and a signal processor. The signal processor may be configured to: apply the captured samples of the received aggressor signal and the captured samples of the received victim signal to a predetermined model which represents crosstalk voltage induced onto the received victim signal from the received aggressor signal, to produce a system of equations, wherein the model includes a plurality of unknown parameters; ascertain the plurality of unknown parameters in the predetermined model from the system of equations; and apply the predetermined model with the ascertained parameters to the captured samples of the received aggressor signal to estimate the crosstalk voltage.

In some embodiments, the measurement instrument further comprises a display device, and the signal processor is further configured to remove from the received victim signal the estimated crosstalk voltage induced onto the victim signal from the aggressor signal, to display via the display device the received victim signal with the estimated crosstalk voltage removed.

In some embodiments, the measurement instrument is configured: to recover a clock for the victim signal from the captured samples of the received victim signal; to ascertain intersymbol interference (ISI) in the received victim signal; and to ascertain the unknown parameters of the predetermined model from the captured samples of the received victim signal, the captured samples of the received aggressor signal, and the ISI in the received victim signal.

In some embodiments, the measurement instrument is configured: to recover a clock for the victim signal from the captured samples of the received victim signal; to ascertain intersymbol interference (ISI) in the received victim signal; to recover a clock for the aggressor signal from the captured samples of the received aggressor signal; and to ascertain the unknown parameters of the predetermined model from the captured samples of the received victim signal, the captured samples of the received aggressor signal, and the ISI in the received victim signal.

In some versions of these embodiments, the model may be: $M_v = h_v * I_v + h_a * I_A$, where $I_v$ is a vector representing the victim signal with no ISI and no crosstalk voltage, $I_A$ is a vector representing a serial data aggressor signal with no ISI and no crosstalk voltage, $h_v$ is an ISI filter function, and $h_a$ is a crosstalk filter function.

In some versions of these embodiments, the model may be: $M_v = h_v * I_v + h_a * M_A$, where $I_v$ is a vector representing the victim signal with no ISI and no crosstalk voltage, $M_A$ is a vector representing the aggressor signal, $h_v$ is an ISI filter function, and $h_a$ is a crosstalk filter function.

In some embodiments, the model may be: $M_v = h_v * [I_v * (h_a^H * (M_A - k)) \cdot Z^H + (h_a^L * (M_A - k)) \cdot Z^L]$, where: $I_v$ is a vector representing the victim signal with no ISI and no crosstalk voltage from the received supply voltage; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the captured samples of the received supply voltage; $M_V$ is a vector which represents the captured samples of the received victim signal; and k is a constant.

In some embodiments, the model may be: $M_v = h_v * I_v + h_a^H * (h_V * (M_A \cdot Z^H)) - k^H (h_v * Z^H) + h_a^L * (h_V * (M_A \cdot Z^L)) - k^L (h_v * Z^L)$, where: $I_v$ is a vector representing the victim signal with no ISI and no crosstalk voltage from the received supply voltage; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the captured samples of the received supply voltage; $M_V$ is a vector which represents the captured samples of the received victim signal; and $k^H$ and $k^L$ are constants.

In some versions of these embodiments, the unknown parameters include coefficients in the ISI filter function and in the crosstalk filter functions.

In some versions of these embodiments, the signal processor is configured to ascertain the plurality of unknown parameters in the predetermined model by: ascertaining the ISI in the received victim signal; and after ascertaining the ISI in the received victim signal, subsequently ascertaining the coefficients of the crosstalk filter function by applying the captured samples of the received aggressor signal and the received victim signal to the predetermined model using the ascertained ISI.

In some versions of these embodiments, the victim signal comprises a repeating data pattern such that the captured samples of the received victim signal include a plurality of instances of the data pattern, and wherein the signal processor is configured to ascertain the coefficients of the ISI filter function by: ascertaining an average vector of average captured samples of the received victim signal over the plurality of instances of the data pattern for each sample point in the data pattern; and ascertaining the ISI in the received victim signal from the average vector and the data pattern.

In some versions of these embodiments, the signal processor is configured to ascertain the ISI in the received victim signal by ascertaining the coefficients of the ISI filter function by solving a set of linear equations wherein the captured samples of the received victim signal are set equal to a convolution of the ISI filter function and the vector representing the victim signal with no ISI and no crosstalk voltage from the received supply voltage.

In some embodiments, the measurement instrument is further configured to eliminate a skew between the captured samples of the received supply voltage waveform and the captured samples of the received victim signal before applying the captured samples of the received supply voltage waveform and the captured samples of the received victim signal to the predetermined model.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
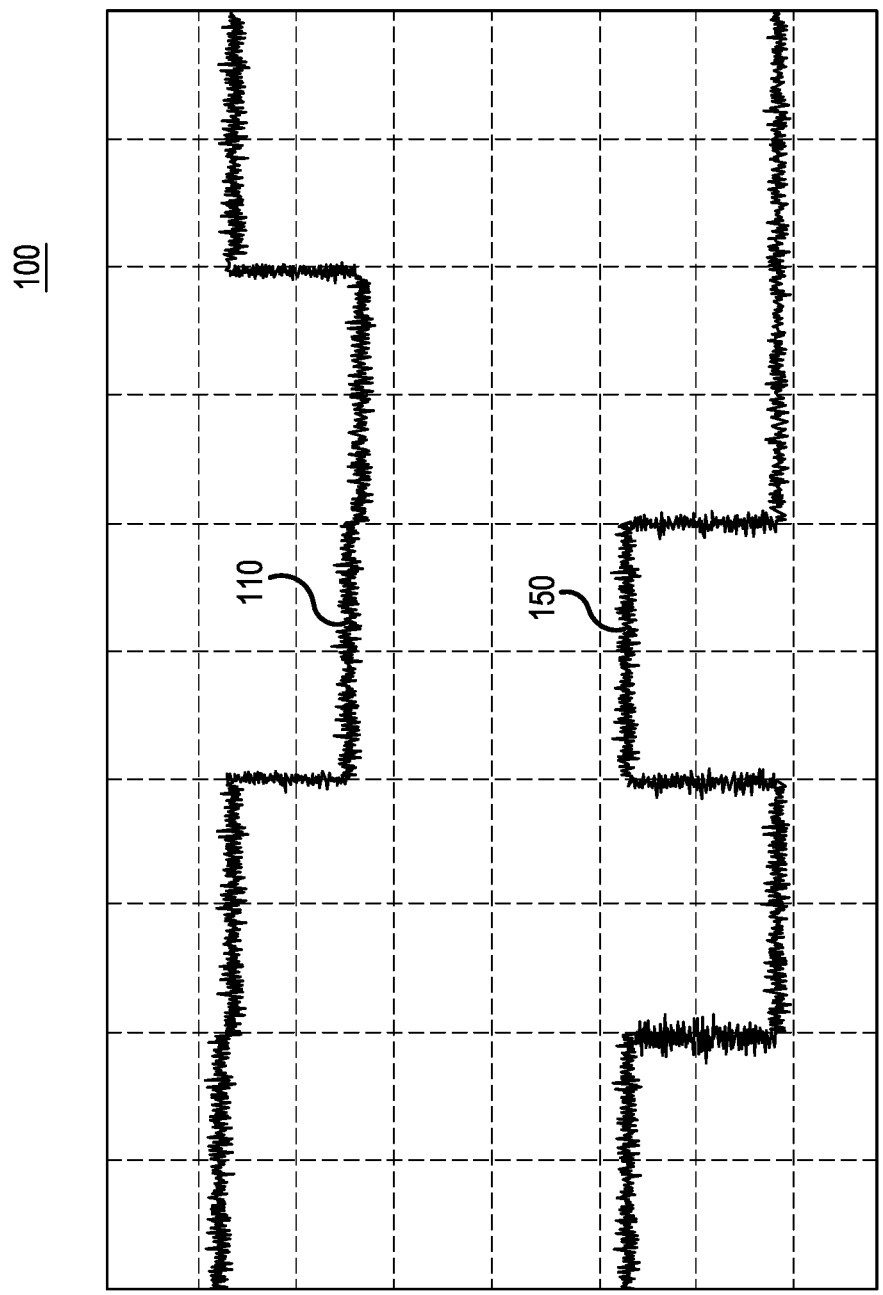
FIG. 1 illustrates a display of an example of waveform of an aggressor signal and a waveform of a victim signal for a device under test.

FIG. 1 illustrates a display 100 of an example of waveform 110 of a victim signal and a waveform 150 of an aggressor signal for a device under test. As shown in FIG. 1, waveform 150 of the aggressor signal includes noise and/or distortion. Waveform 110 also includes noise/and or distortion. Here, some or all of the noise or distortion in waveform 110 is a result of crosstalk from the aggressor signal which is represented by waveform 150. Waveform 110 may also include distortion due to intersymbol interference (ISI) from aggressor bits to victim bits in the victim signal. Embodiments of measurement instruments and methods disclosed herein may estimate the crosstalk induced onto the victim signal which is represented by signal waveform 110 from the aggressor signal which is represented by waveform 150.

Embodiments of measurement instruments and methods disclosed herein may estimate the ISI present in the victim signal which is represented by signal waveform 110. Some embodiments may also remove the estimated crosstalk and/or ISI from signal waveform 110 and display what signal waveform 110 would look like in the absence of the crosstalk and/or ISI.

Figure 4:
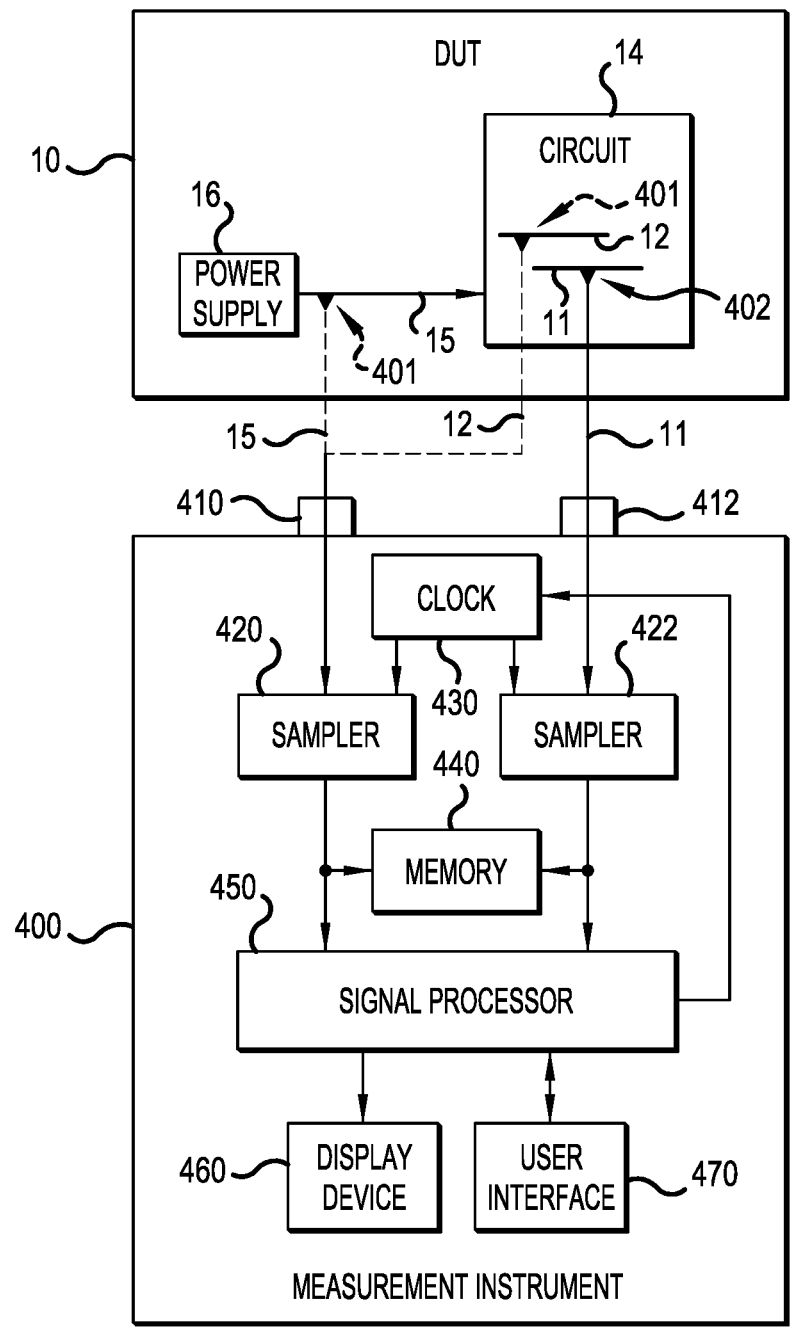
FIG. 4 is a simplified block diagram of an example embodiment of a measurement instrument which may analyze voltage-dependent power supply crosstalk induced onto a signal of a device under test.

FIG. 4 is a simplified block diagram of an example embodiment of a measurement instrument 400 which may analyze crosstalk induced onto a victim signal 11 of an example device under test (DUT) 10.

Here, example DUT 10 includes a circuit 14, for example a high speed digital communication circuit, and at least one power supply 16. Circuit 14 is powered by one or more supply voltages, including at least one supply voltage 15 produced by power supply 16.

In DUT 10, a victim signal 11 of circuit 14 may experience crosstalk interference from an aggressor signal 12 and/or power supply crosstalk of supply voltage 15.

In some embodiments, measurement instrument 400 may be a digital oscilloscope.

Measurement instrument 400 may include: a first input 410 configured to receive (e.g., via a first probe 401) aggressor signal 12 or supply voltage 15 from a DUT 10; a first sampler 420 configured to capture samples of received aggressor signal 12 or supply voltage 15; a second input 412 configured to receive (e.g., via a second probe 402) victim signal 11 from DUT 10; a second sampler 422 configured to capture samples of received victim signal 11; and a signal processor 450.

Here, for simplicity, measurement instrument is shown having only two inputs 410 where first input 410 receives either aggressor signal 12 or supply voltage 15 from DUT 10. However, in general measurement instrument may have more that two inputs and may simultaneously receive victim signal 11, aggressor signal 12, supply voltage 15, and perhaps additional supply voltages or signals from DUT 10.

In some embodiments, each of first sampler 420 and second sampler 422 may include an analog-to-digital converter (ADC) which may be clocked in response to a clock 430 of measurement instrument. In some embodiments, clock 430 may be recovered from the captured samples of received victim signal 11 by any of many clock recovery techniques known to those skilled in the art.

Measurement instrument 400 may include a display device 460 and a user interface 470. Display device 460 may include a liquid crystal display (LCD), a plasma display, a cathode ray tube (CRT), etc. User interface 370 may include one or more of: a keyboard, a keypad, control knobs, a mouse, a trackball, buttons, indicator lights, etc., and associated processor and software for implementing user interface 370.

Measurement instrument 400 may include memory 440 which may store therein digitized samples of victim signal 11 captured by first sampler 420 and digitized samples of aggressor signal 12 or supply voltage 15 captured by second sampler 422. In that case, in some embodiments the digitized samples may be communicated by measurement instrument 400 under control of a controller or processor (not shown) via a communications interface (also not shown) to an external device such as a computer where the digitized samples may be processed as described below with respect to signal processor 450. The communication interface may be any suitable interface, for example conforming to standards such as Ethernet, specialized test instrument standards, etc. In some embodiments, the communication interface may allow measurement instrument to communicate commands and data with one or more external computers and/or other measurement instruments via the Internet.

Measurement instrument 400 may include other components and subsystems not illustrated in FIG. 4 so as not to obscure features of measurement instrument described herein for estimating a crosstalk voltage induced onto received victim signal 11.

First, a case will be described wherein measurement instrument receives and measures aggressor signal 12 and estimates crosstalk induced onto victim signal 11 from aggressor signal 12. Subsequently, a case will be described wherein measurement instrument receives and measures supply voltage 15 and estimates crosstalk induced onto victim signal 11 from supply voltage 15.

Measurement instrument 400 may estimate crosstalk induced onto victim signal 11 from aggressor signal 12 using a predetermined model implemented by signal processor 450. The predetermined model may represent the crosstalk as a function of the received victim signal and a plurality of unknown parameters. Signal processor 450 may process the captured samples of received victim signal 11 and received aggressor signal 12 to determine or ascertain a plurality of unknown parameters of the predetermined model which apply to the particular received victim signal 11 and the particular received aggressor signal 12. Signal processor 450 may then apply the predetermined model with the parameters as determined above to received victim signal 11 and received aggressor signal 12 to estimate the crosstalk induced onto received victim signal 11 from received aggressor signal 12. In some embodiments, signal processor 450 may then remove from received victim signal 11 the crosstalk induced thereon by aggressor signal 12. In some embodiments, measurement instrument 400 may then display to a user a signal waveform for the victim signal with the crosstalk from aggressor signal 12 removed.

In some embodiments, signal processor 450 may determine or ascertain the parameters of the predetermined model for estimating voltage-dependent power supply crosstalk induced onto victim signal 11 from aggressor signal 12 from only a single set of simultaneously performed measurements or acquisitions of victim signal 11 and aggressor signal 12.

Further details of embodiments of a procedure described above for estimating crosstalk induced onto victim signal 11 from aggressor signal 12 will now be described in connection with signal processor 450 and measurement instrument 400. However, as noted above, in some alternative embodiments, some or all of the operations mentioned above and described in greater detail below may be performed "offline" on previously-captured samples of received victim signal 11 and received aggressor signal 12 that have been stored in memory, so long as the data for the received victim signal 11 and the received aggressor signal 12 were captured or generated to be in sync with each other. In still other embodiments, some or all of these operations may be performed on data for a victim signal which was generated from a simulation of the device under test.

Beneficially, the predetermined model described above separates crosstalk interference onto victim signal 11 into two components: (1) a component caused by intersymbol interference (ISI) in victim signal 11, itself; and (2) the component that is desired to be ascertained or determined which is caused by crosstalk interference from aggressor signal 12. ISI can be generated from many things, in particular as a result of finite bandwidth in the transmission channel for victim signal 11 and from reflections at critical points in the transmission channel, but by definition all of these things are correlated with the data in victim signal 11, itself. In contrast, interference from aggressor signal 12 is generally uncorrelated with the data in victim signal 11, and advantage is taken of this fact to facilitate separation of the ISI from the crosstalk interference from aggressor signal 12.

Beneficially, signal processor 450 may perform a series of pre-processing operations, including edge detection in victim waveform 11 and clock recovery from victim waveform 11. Beneficially, measurement instrument 400 may have incorporated therein the ability to employ standard methods for performing these pre-processing operations, and any of these standard methods may be employed. For example, measurement instrument 400 may allow a user (e.g., via user interface 470) to specify voltage thresholds for defining the timing of an edge of bit transition 112. Measurement instrument 400 also may allow a user (e.g., via user interface 470) to specify one of many built-in clock recovery algorithms to be applied to victim signal 11 to recover clock 430.

Beneficially, signal processor 450 may perform a de-skewing pre-processing operation to eliminate or compensate for small time shifts or skew between victim signal 11 and aggressor signal 12.

Assuming any pre-processing operations described above are performed, an initial operation may be to apply the captured samples of the received aggressor signal 12 and the captured samples of the received victim signal 11 to the predetermined model which crosstalk induced onto received victim signal 11 from aggressor signal 12, to produce a system of equations which can be solved to determine or ascertain the unknown parameters of the predetermined model.

In some embodiments, measurement instrument 400 may extract from victim signal 11 an ideal data pattern for victim signal 11 which does not include ISI and which does not include any crosstalk interference. That is, the ideal data pattern for victim signal 11 represents how received victim signal 11 would appear in the absence of intersymbol interference (ISI) and crosstalk. Those skilled in the art will know algorithms by which the ideal data pattern for victim signal 11 can be determined from the received victim signal 11.

One example of a model for crosstalk induced onto victim signal 11 from aggressor signal 12 which may be employed by measurement instrument 400 may be represented by equation (1) as:

$$M_v = h_v * I_v + h_a * M_A, \tag{1}$$

where $I_v$ is a vector representing victim signal 11 with no ISI and no crosstalk voltage, $M_A$ is a vector representing received aggressor signal 12, $h_v$ is an ISI filter function, and $h_a$ is a crosstalk filter function.

In some embodiments, measurement instrument 400 may also extract from aggressor signal 12 an ideal data pattern for aggressor signal 12 which does not include ISI and which does not include any crosstalk interference.

In that case, another example of a model for crosstalk induced onto victim signal 11 from aggressor signal 12 which may be employed by measurement instrument 400 may be represented by equation (2) as:

$$M_v = h_v * I_v + h_a * I_A, \tag{2}$$

where $I_A$ is a vector representing a serial data aggressor signal 12 with no ISI and no crosstalk voltage.

Where the model of equation (1) or the model of equation (2) is employed, some embodiments of methods and systems for estimating crosstalk induced onto a victim signal from an aggressor signal may address this problem by first solving for the coefficients of the ISI filter function $h_v$, and then plugging the solution for the ISI filter function $h_v$ back into equation (1) or equation (2) to create a linear system of equations having the unknown parameters of $h_a$, i.e., a set of filter coefficients for the crosstalk filter function $h_a$. In doing so, it is assumed that the ISI distortion in received victim signal 11 is uncorrelated with crosstalk interference from aggressor signal 12. In general, this assumption is a good one.

Thus, in some embodiments, equation (1) or (2) may be solved by first determining or ascertaining the unknown parameters or coefficients of ISI filter function $h_v$.

A couple of example techniques for ascertaining the unknown parameters or coefficients of ISI filter function $h_v$ will now be described.

In some embodiments, a first technique may be employed to find the unknown parameters or coefficients of ISI filter function $h_v$ when victim signal 11 is periodic or includes a repeating pattern, such as a pseudo random bitstream (PRBS). For example, in some cases DUT 10 may have an internal function, which may be selected by a user, to cause victim signal 11 to have the repeating pattern. In some cases, DUT 10 may have an input to receive a signal which includes a repeating pattern or PRBS and may generate victim signal 11 therefrom also to have a repeating pattern.

In case victim signal 11 is periodic or includes a repeating pattern, then the captured samples of received victim signal 11 may be divided into sections which are each one pattern long, and all of those sections may be averaged together. The averaging operation averages out any components of the captured data which are uncorrelated with the pattern, including noise and crosstalk from an aggressor signal 12. The result of the averaging is the waveform, $A_v$, which is the sum of the ideal waveform $I_v$ and the ISI according to equation (3):

$$A_v = I_v + ISI \tag{3}$$

Thus, the ISI can be obtained by subtracting the ideal waveform $I_v$ from the average waveform $A_v$. Here, however, it may not be necessary for measurement instrument 400 to extract ideal waveform $I_v$ from received victim signal 11, as the voltage levels of the data pattern (e.g., PRBS pattern) may be known or available to measurement instrument 400, and the output of clock 430 may define their locations in time. Once the ISI is obtained, then the coefficients of the ISI filter function $h_v$ may be ascertained from equation (4):

$$ISI = h_v * I_v \tag{4}$$

In some embodiments, a second technique may be employed to find the unknown parameters or coefficients of ISI filter function $h_v$ by solving a linear system of equations to enforce equation (5):

$$M_v \pm h_v * I_v \tag{5}$$

Equation (5) ignores the crosstalk term in equations (1) and (2) because, as explained above, that portion is not correlated with the data pattern of victim signal 11 and in general should average out over a large number of captured samples. This forces the resulting ISI filter to represent only components of the measured waveform $M_v$ which are correlated with the ideal waveform $I_v$. The right hand side of equation (5) is equal to the average waveform $A_v$:

$$A_v = h_v * I_v \tag{6}$$

As noted above, once the coefficients of the ISI filter $h_v$ are obtained, by whatever technique may be employed, then they can be plugged back into equation (1) or equation (2) to construct a linear system of equations having the unknown parameters of $h_a$, i.e., a set of filter coefficients for the crosstalk filter function $h_a$.

Figure 2:
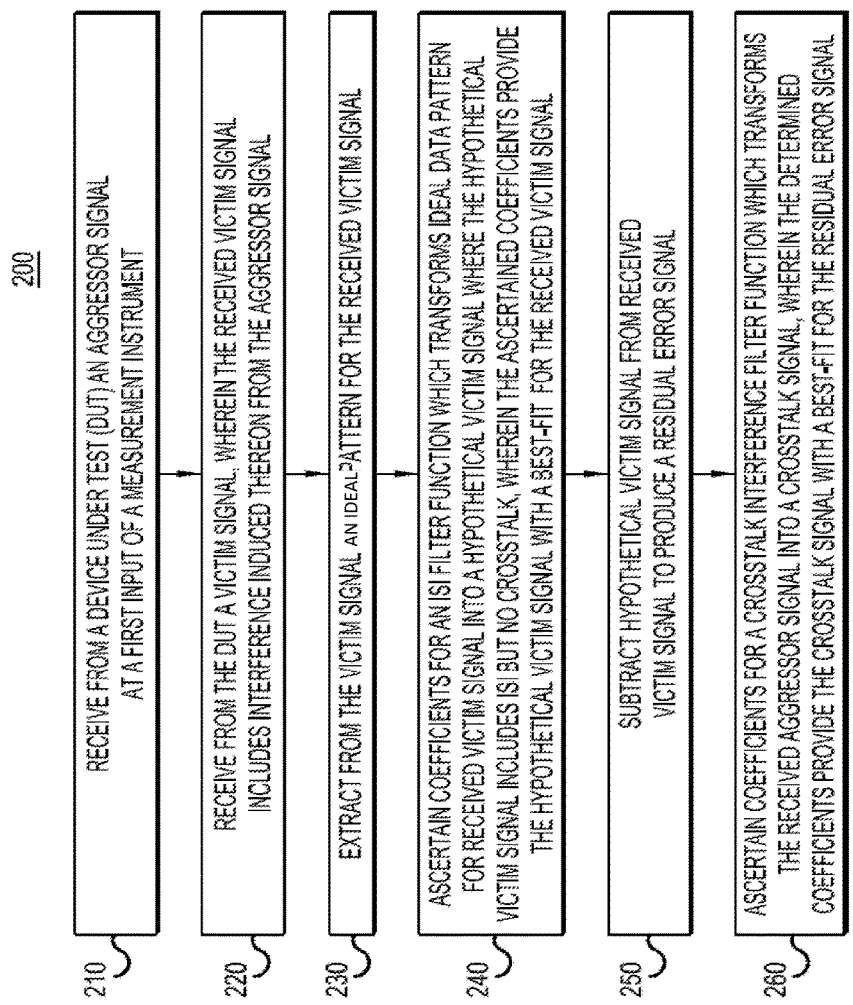
FIG. 2 is a flowchart of an example embodiment of a method of analyzing crosstalk from an aggressor signal onto a victim signal of a device under test.

Summarizing an example of some of the procedures described above, FIG. 2 is a flowchart of an example embodiment of a method 200 of analyzing crosstalk from an aggressor signal onto a victim signal of a device under test.

In an operation 210, a measurement instrument receives at a first input an aggressor signal from a device under test (DUT).

In an operation 220, the measurement instrument receives at a second input a victim signal 11 from the DUT 10, wherein the received victim signal includes crosstalk voltage induced thereon from the aggressor signal.

An operation 230 includes extracting from the victim signal an ideal data pattern for the received victim signal which does not include ISI and which does not include crosstalk interference from the aggressor signal. Here, the ideal data pattern represents how the received victim signal would appear in the absence of intersymbol interference (ISI) and crosstalk.

An operation 240 includes ascertaining coefficients for an ISI filter function which transforms the ideal data pattern for the received victim signal into a hypothetical victim signal where the hypothetical victim signal includes ISI but no crosstalk voltage induced thereon, wherein the ascertained coefficients provide the hypothetical victim signal with a best-fit for the received victim signal.

An operation 250 includes subtracting the hypothetical victim signal from the received victim signal to produce a residual error signal.

An operation 260 includes ascertaining coefficients for a crosstalk interference filter function which transforms the received aggressor signal into a crosstalk signal, wherein the determined coefficients provide the crosstalk signal with a best-fit for the residual error signal.

In some embodiments, the method may further include applying the crosstalk interference filter function with the ascertained coefficients thereof to the received aggressor signal to estimate crosstalk voltage induced onto the victim signal from the aggressor signal.

In some embodiments, a method further includes removing the ISI and/or the estimated crosstalk voltage from the victim signal, and displaying on a display device the victim signal with the ISI and/or estimated crosstalk voltage removed.

As mentioned above, in some cases victim signal 11 may have a crosstalk voltage which is induced thereon from supply voltage 15. In some cases, the amplitude interference that supply voltage 15 may add to victim signal 11 may be non-linear or voltage dependent, and may require some modifications of the operations discussed above with respect to crosstalk interference from aggressor signal 12 onto victim signal 11. Methods and systems for analyzing voltage dependent crosstalk will now be described in the specific context where the aggressor signal is a supply voltage. However, it should be understood that in general these techniques may be applicable to any voltage dependent crosstalk mechanism and corresponding aggressor and victim signals.

Figure 3:
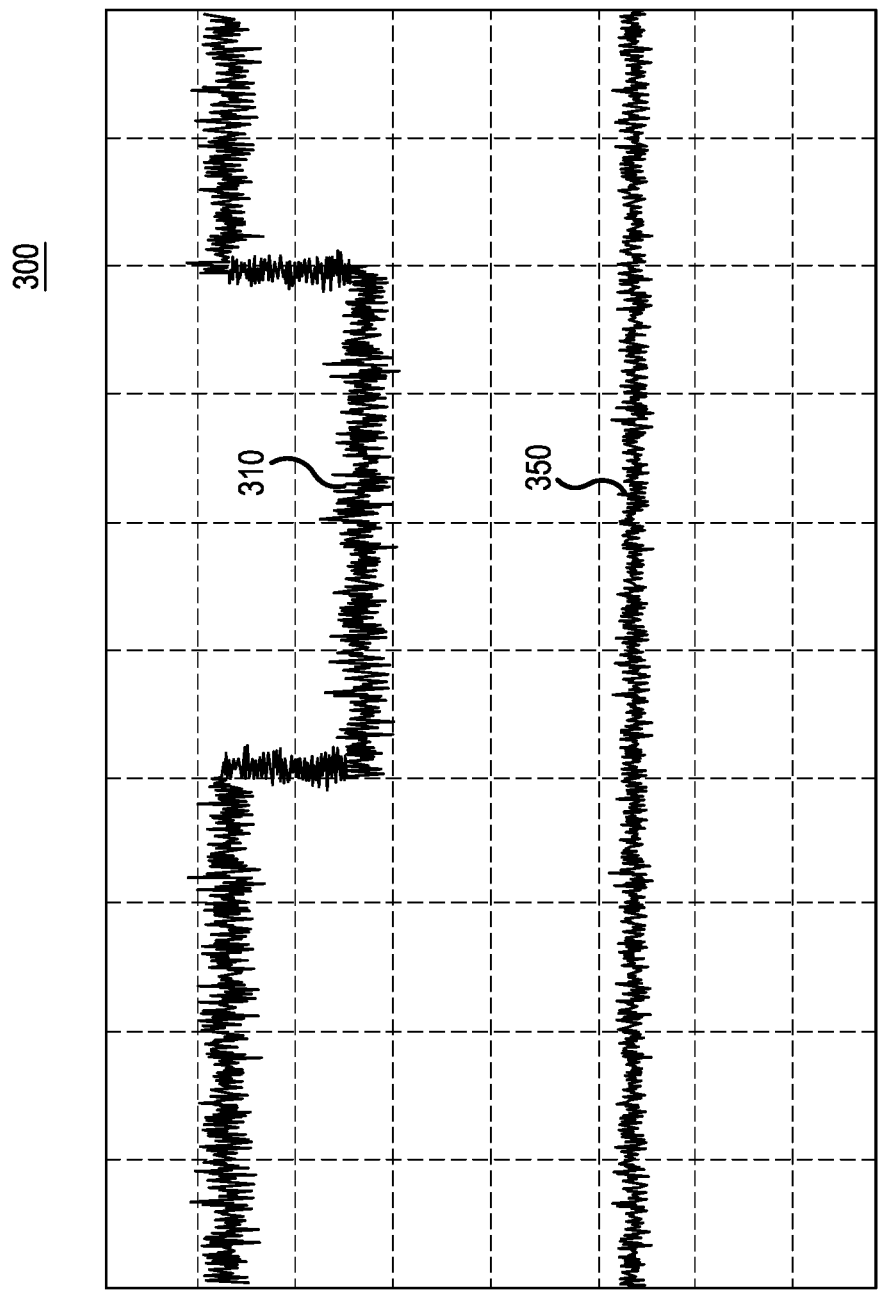
FIG. 3 illustrates a display of an example of a signal waveform and a supply voltage waveform for a circuit which employed the supply voltage to produce the signal.

FIG. 3 illustrates a display of an example of a victim signal waveform 310 for a victim signal (e.g., victim signal 11) and a supply voltage waveform 350 for a supply voltage (e.g., supply voltage 15) which is used to produce the victim signal which is represented by victim signal waveform 310. As shown in FIG. 3, there is noise riding on supply voltage waveform 350. There is also noise riding on victim signal waveform 310. Here, some or all of the noise on victim signal waveform 310 is a result of voltage-dependent power supply crosstalk from the supply voltage which is represented by supply voltage waveform 350.

Embodiments of measurement instruments and methods disclosed herein may estimate the voltage-dependent power supply crosstalk induced onto the victim signal which is represented by signal waveform 310 from the supply voltage which is represented by supply voltage waveform 350. Some embodiments may also remove the estimated voltage-dependent power supply crosstalk from signal waveform 310 and display what signal waveform 310 would look like in the absence of the voltage-dependent power supply crosstalk Similar to the case of signal-signal crosstalk, measurement instrument 400 may estimate the voltage-dependent power supply crosstalk induced onto victim signal 11 using a predetermined model implemented by signal processor 450 for determining voltage-dependent power supply crosstalk induced onto received victim signal from the supply voltage. The predetermined model may represent the voltage-dependent power supply crosstalk as a function of the received victim signal and a plurality of unknown parameters. Signal processor 450 may process the captured samples of received victim signal 11 and received supply voltage 15 to determine or ascertain a plurality of unknown parameters of the predetermined model which apply to the particular received victim signal 11 and the particular received supply voltage 15. Signal processor 450 may then apply the predetermined model with the parameters as determined above to received victim signal 11 and received supply voltage 15 to estimate the voltage-dependent power supply crosstalk induced onto received victim signal 11 from received supply voltage 15. In some embodiments, signal processor 450 may then remove the estimated voltage-dependent power supply crosstalk from the received victim signal 11. In some embodiments, measurement instrument 400 may then display to a user a signal waveform for the victim signal with the voltage-dependent power supply crosstalk removed.

In some embodiments, signal processor 450 may determine or ascertain the parameters of the predetermined model for estimating voltage-dependent power supply crosstalk induced onto victim signal 11 from supply voltage 15 from only a single set of simultaneously performed measurements or acquisitions of victim signal 11 and supply voltage 15.

Further details of embodiments of a procedure described above for estimating voltage-dependent power supply crosstalk induced onto victim signal 11 will now be described in connection with signal processor 450 and measurement instrument 400. However, as noted above, in some alternative embodiments, some or all of the operations mentioned above and described in greater detail below may be performed "offline" on previously-captured samples of received victim signal 11 and received supply voltage 15 that have been stored in memory, so long as the data for the received victim signal 11 and the received supply voltage 15 were captured or generated to be in sync with each other. In still other embodiments, some or all of these operations may be performed on data for a victim signal which was generated from a simulation of the device under test.

Beneficially, the predetermined model described above separates crosstalk interference onto victim signal 11 into two components: (1) a component caused by intersymbol interference (ISI) in victim signal 11, itself; and (2) the component that is desired to be ascertained or determined which is caused by crosstalk interference from supply voltage 15. ISI can be generated from many things, in particular as a result of finite bandwidth in the transmission channel for victim signal 11 and from reflections at critical points in the transmission channel, but by definition all of these things are correlated with the data in victim signal 11, itself. In contrast, interference from supply voltage is generally uncorrelated with the data in victim signal 11, and advantage is taken of this fact to facilitate separation of the ISI from the crosstalk interference from supply voltage 15.

Beneficially, signal processor 450 may perform a series of pre-processing operations, similar to those discussed above in the case of analyzing interference from aggressor signal 12, including edge detection in victim waveform 11 and clock recovery from victim waveform 11. Beneficially, measurement instrument 400 may have incorporated therein the ability to employ standard methods for performing these pre-processing operations, and any of these standard methods may be employed. For example, measurement instrument 400 may allow a user (e.g., via user interface 470) to specify voltage thresholds for defining the timing of an edge of bit transition 112. Measurement instrument 400 also may allow a user (e.g., via user interface 470) to specify one of many built-in clock recovery algorithms to be applied to victim signal 11 to recover clock 430.

Beneficially, signal processor 450 may perform a de-skewing pre-processing operation to eliminate or compensate for small time shifts or skew between supply voltage 15 and victim signal 11.

Assuming any pre-processing operations described above are performed, an initial operation may be to apply the captured samples of the received supply voltage 15 and the captured samples of the received victim signal 11 to the predetermined model which represents voltage-dependent power supply crosstalk induced onto received victim signal 11 from supply voltage 15, to produce a system of equations which can be solved to determine or ascertain the unknown parameters of the predetermined model.

Beneficially, in this case, as it is an objective to estimate voltage-dependent power supply crosstalk induced onto victim signal 11, the predetermined model is non-linear and voltage dependent. Furthermore, the model represents the concept that the voltage-dependent power supply crosstalk induced onto victim signal 11 may be different when victim signal is at a "high" signal level than when it is at a "low" signal level. To simplify the description, we begin by analyzing just the "high" bits of victim signal 11, and then extend the analysis to a full waveform having both "high" bits and "low" bits.

Given that victim signal 11 is a non-return-to-zero (NRZ) data signal whose ideal "low" and "high" bit values are −1 and +1, respectively, then one example of a model for voltage-dependent power supply crosstalk induced onto the "high" bits of victim signal 11 is:

$$M_v^H = h_v * \left[ I_v + (h_a^H * (M_A - k)) \cdot \frac{1 + I_v}{2} \right], \quad (7)$$

where: $I_v$ is a vector representing victim signal 11 with no ISI and no crosstalk voltage from received supply voltage 15 (i.e., the ideal waveform for victim signal 11); $h_v$ is an ISI filter function; $h_a^H$ is a crosstalk filter function for high data bits of received victim signal 11; $M_A$ is a vector which represents the captured samples of received supply voltage 15; $M_V^H$ is a vector which represents the captured samples of received victim signal 11, limited only to the samples for high level bits of received victim signal 11; and k is a constant representing the DC level of received supply voltage 15. The model is discrete, so the "·" operator in equation (7) represents point-wise multiplication of the samples.

Further explanation of terms included in the model of equation (7) will now be provided.

The term ($M_A$-k) represents the interfering signal—i.e., supply voltage 15. Supply voltage 15 may in some cases have a large DC component, but the crosstalk interference which supply voltage 15 produces on victim signal 11 does not a DC component. Because of this, signal processor 450 may subtract the DC component from the captured samples of supply voltage 15 in equation (7) so that the filters $h_v$ and $h_a^H$ only operate on the part of supply voltage 15 which deviates from its nominal value and is responsible for generating the voltage-dependent power supply crosstalk. Here, signal processor 450 does not need to know the DC value k in advance; it can be determined in the course of solving equation (7).

The term $$\frac{1 + I_v}{2}$$

insures that equation (7) only operates on the high level bits of received victim signal 11, because the term reduces to "1" when received signal level 11 is at the high level (+1) and reduces to "0" when received signal level 11 is at the low level (−1). This operation is non-linear, which increases the difficulty of finding a solution.

The term $h_a^H$, which is the crosstalk filter function for high data bits of received victim signal 11, represents an unknown linear transform which maps received supply voltage 15 to the crosstalk interference which is imposed on received victim signal 11. Supply voltage 15 may be low-pass filtered, or undergo some other transformation between the point where it is sampled and the point where it is coupled to received victim signal 11.

Once supply voltage 15 has been filtered by the crosstalk filter function and selected for high or low bits, it is added to the ideal waveform $I_v$ for victim signal 11.

The operations discussed thus far may occur internally to DUT 10 at a circuit where victim signal 11 is generated and transmitted. Thus far, the components of the model of equation (7) which have been discussed has simply replaced an ideal supply voltage 15 with a distorted one, whose output is used to create the high bits of victim signal 11.

Physically, once victim signal 11 is created in DUT 10, it is transmitted down a transmission line or channel to a receiving circuit. The term $h_v$, which is an ISI filter function, represents the ISI which victim signal 11 experiences as it travels down the transmission line or channel to the receiving circuit in DUT 10. So this is the final component of the model of equation (7) which produces the captured samples $M_V^H$ of received victim signal 11 at the point where it is probed by second probe 402 and measurement instrument 400.

For simplicity, the model of equation (7) was only for the high bits of victim signal 15. However a complete model must account for both high bits and low bits of victim signal 15. Let $Z^H$ be a vector $(1+I_v)/2$, which is a point-wise multiplier for high bits, and let $Z^L$ be a vector $(1-I_v)/2$, which is a point-wise multiplier for low bits. In that case, then one example of a model for voltage-dependent power supply crosstalk induced onto victim signal 11 is:

$$M_v = h_v * [I_v + (h_a^H * (M_A - k)) \cdot Z^H + (h_a^L * (M_A - k)) \cdot Z^L] \quad (8)$$

where $M_V$ is a vector which represents the captured samples of the received victim signal.

Look at equation (8), the unknowns to be solved for are the parameters (e.g., coefficients) of filters $h_v$, $h_a^H$ and $h_a^L$, and the constant k.

The lengths and number of taps of ISI filter function $h_v$ and crosstalk filter function $h_a$ may be selected to be any appropriate values. Beneficially, the filter formats for ISI filter function $h_v$ and crosstalk filter functions $h_a^H$ and $h_a^L$ may include equally-spaced digital filters defined over a time span or using a defined number of taps, or filter taps that are sub-sampled on equally-spaced, or non-equally spaced grid, or filter taps that are averaged together, or any other commonly employed representation. In some embodiments, the configurations or formats of ISI filter function $h_v$ and crosstalk filter functions $h_a^H$ and $h_a^L$ may be specified by a user, or may be determined automatically by measurement instrument 400.

In some embodiments, ISI filter function $h_v$ and crosstalk filter functions $h_a^H$ and $h_a^L$ may be linear filters with a defined number of taps and define tap spacings and having unknown or unspecified coefficients, where the unknown coefficients may be the unknown parameters of the predetermined model which represents the crosstalk which is induced onto the received victim signal from the supply voltage (and from ISI). In some embodiments, ISI filter function $h_v$ may be defined to have 65 unequally-spaced taps, and crosstalk filter functions $h_a^H$ and $h_a^L$ may each be defined to have 65 unequally-spaced taps. In that case, the unknown parameters for the model which are to be determined by signal processor 450 for a particular supply voltage 15 and received victim signal 11 may include a total of 195 coefficients for the filter taps.

However, in its current form it is difficult to find all of the parameters (e.g., coefficients) of the filters of the model of equation (8) because of the non-linear operation of the point-wise multipliers $Z^H$ and $Z^L$.

Further details will now be described regarding embodiments of procedures for determining or ascertaining the unknown parameters (e.g., filter function coefficients) of a predetermined model which represents the crosstalk induced onto the received victim signal from an aggressor signal (e.g., a supply voltage), where the predetermined model is represented by equation (8).

To facilitate finding a solution, a linear approximation to the model of equation (8) may be created by swapping the order of the convolution and the point-wise multiplication so that:

$$(h_a^H * (M_A - k)) \cdot Z^H \rightarrow h_a^H * ((M_A - k) \cdot Z^H) = h_a^H * (M_a \cdot Z^H - k \cdot Z^H) \quad (9A)$$

for the high bits, and:

$$(h_a^L * (M_A - k)) \cdot Z^L \rightarrow h_a^L * ((M_a - k) \cdot Z^L) = h_a^L * (M_a \cdot Z^L - k \cdot Z^L) \quad (9A)$$

for low bits.

In the new, modified, model represented by substituting equations (9A) and (9B) into equation (8), the samples of supply voltage 15 are limited to those corresponding to high bits (for equation (9A)) before applying the filter function $h_a^H$ (and similarly are limited to those corresponding to low bits (for equation (9B)) before applying the filter function $h_a^L$. Ideally, as indicated in equation (8), the captured samples $M_A$ of received supply voltage 15 would be filtered first, because the distortion occurs before victim signal 11 is created. However in the modified model, supply voltage 15 is first restricted to high bits, and then filter function $h_a^H$ is applied, and restricted, and is likewise restricted to low bits, and then filter function $h_a^L$ is applied. In the original model of equation (8), the filter functions $h_a^H$ and $h_a^L$ are applied to a continuous waveform. But in the modified model, the filter functions are applied to a discontinuous waveform, which, theoretically, may cause some problems. If the distortion is like a low-pass filter, for example, then the filter would smooth out the discontinuities, blurring the boundaries between the high bit portions and low bit portions of the waveform for victim signal 11. In other words, the modified model may take distortion that is meant only to apply to high bits, and may apply it to low bits, and vice versa.

Typically, however, supply voltage 15 drifts only slowly compared to the bit rate of victim signal 11, so it is already of relatively low frequency, and therefore the filter does not need to have a low pass component. Furthermore, the filter is not a scalar quantity. It is composed of several filter taps, the coefficients of each of which will be ascertained so as to match the data as well as possible, thus helping to compensate for differences between the model of equation (8), and the model of equation (4) modified by the substitutions of equations (9A) and (9B). Finally, the ISI filter typically has a low-frequency component anyway, which means that if the model blurs the boundaries between the low bits and the high bits, it will not necessarily harm the results.

Returning back to equation (8), after making the substitutions of equations (9A) and (9B), multiplying through by the ISI filter function $h_v$, and re-arranging the order of some convolutions, one obtains:

$$M_v = h_v * I_v + h_a^H * (h_V * (M_A \cdot Z^H)) - k^H(h_v * Z^H) + h_a^L * (h_V * (M_A \cdot Z^L)) - k^L(h_v * Z^L) \quad (10)$$

where $k^H = h_a^H * k$ and $k^L = h_a^L * k$.

Equation (10) has accounted for the voltage-dependent non-linearity, but the convolutions of $h_v$ with $h_a^L$ and with $k_a^H$ in equation (10) present another source of non-linearity, since convolution is like multiplication. That is, a linear system must consist of a linear combination of unknown parameters or elements, meaning a sum of terms which are multiplied by a constant. In other words, a linear system cannot include terms which involve unknowns which are multiplied by each other.

Similar to what was described above in the "linear case" of interference from aggressor signal 12, in some embodiments of methods and systems for estimating voltage-dependent crosstalk induced onto a victim signal from an aggressor signal according to the model of equation (10) may address this problem by first solving for the coefficients of the ISI filter function $h_v$, and then plugging the solution for the ISI filter function $h_v$ back into equation (10) to create a linear system of equations having the unknown parameters of $h_a^L$, $h_a^H$, $k^H$, and $k^L$, where the unknown parameters of $h_a^L$ and $h_a^H$ include a set of filter coefficients, and where $k^H$ and $k^L$ are constants. In doing so, it is assumed that the ISI distortion in received victim signal 11 is uncorrelated with crosstalk interference from supply voltage 15. In general, this assumption is a good one, because ISI distortion typically consists of a low-pass term, which depends on the finite bandwidth of the transmission channel of victim signal 11, and a data-dependent term which depends on the specific sequence or pattern of high and low data bits in victim signal 11. In general, the crosstalk interference from supply voltage 15 is not a function of these things, and therefore the filter coefficients of $h_v$ can be treated as uncorrelated with the filter coefficients of $h_a^L$ and $h_a^H$.

Thus, in some embodiments, equation (10) may be solved by first determining or ascertaining the unknown parameters or coefficients of ISI filter function $h_v$.

A couple of example techniques for ascertaining the unknown parameters or coefficients of ISI filter function $h_v$ will now be described.

In some embodiments, a first technique may be employed to find the unknown parameters or coefficients of ISI filter function $h_v$ when victim signal 11 is periodic or includes a repeating pattern, such as a pseudo random bitstream (PRBS). For example, in some cases DUT 10 may have an internal function, which may be selected by a user, to cause victim signal 11 to have the repeating pattern. In some cases, DUT 10 may have an input to receive a signal which includes a repeating pattern or PRBS and may generate victim signal 11 therefrom also to have a repeating pattern.

In case victim signal 11 is periodic or includes a repeating pattern, then the captured samples of received victim signal 11 may be divided into sections which are each one pattern long, and all of those sections may be averaged together. The averaging operation averages out any components of the captured data which are uncorrelated with the pattern, including noise and crosstalk from an aggressor such as supply voltage 15. The result of the averaging is the waveform, $A_v$, which is the sum of the ideal waveform $I_v$ and the ISI according to equation (11):

$$A_v = I_v + ISI \quad (11)$$

Thus, the ISI can be obtained by subtracting the ideal waveform $I_v$ from the average waveform $A_v$, which is similar to what was described above with respect to the method of FIG. 2. Here, however, it may not be necessary for measurement instrument 400 to extract ideal waveform $I_v$ from received victim signal 11, as the voltage levels of the data pattern (e.g., PRBS pattern) may be known or available to measurement instrument 400, and the output of clock 430 may define their locations in time. Once the ISI is obtained, then the coefficients of the ISI filter function $h_v$ may be ascertained from equation (12):

$$ISI = h_v * I_v \quad (12)$$

In some embodiments, a second technique may be employed to find the unknown parameters or coefficients of ISI filter function $h_v$ by solving a linear system of equations to enforce equation (13):

$$M_v \approx h_v * I_v \quad (13)$$

Equation (13) ignores most of the right hand side of equation (10) because, as explained above, that portion is not correlated with the data pattern of victim signal 11 and in general should average out over a large number of captured samples. This forces the resulting ISI filter to represent only components of the measured waveform $M_v$ which are correlated with the ideal waveform $I_v$. The right hand side of equation (13) is equal to the average waveform $A_v$:

$$A_v = h_v * I_v \quad (14)$$

As noted above, once the coefficients of the ISI filter $h_v$ are obtained, by whatever technique may be employed, then they can be plugged back into equation (10) to construct a linear system of equations having the unknown parameters of $h_a^L$, $h_a^H$, $k^H$, and $k^L$, where the unknown parameters of $h_a^L$ and $h_a^H$ include a set of filter coefficients, and where $k^H$ and $k^L$ are constants.

This linear system of equations may be written as a matrix equation, where each row of the matrix equation represents one equation that sets a single captured sample of victim signal 11 equal to the convolutions of the ISI and crosstalk filters with a specific set of captured samples of the aggressor signal (e.g., supply voltage 15), and each column represents one unknown.

Solving equation (10) involves an application of linear algebra. Unlike normal algebra, in linear algebra one has to solve a system of several equations all at once, and that means that an exact solution is almost always impossible to obtain. So a matrix equation such as A*x=c, where x is an unknown array of numbers, is generally not treated as an equality but as an ideal or a model. It represents a set of constraints that are being imposed, which may or may not be reasonable. For example, in the case of equation (10), in general there may be many more equations than there are unknowns. That is, the total number of equations M is only limited by the number of data samples which are acquired by measurement instrument 400. So in general the number of equations M>>N, where N is the number of unknown parameters which are to be determined or ascertained.

In that case, in general it is not possible to find a specific set of values for the unknown parameters (e.g., filter coefficients) that will be make all of those equations true. Instead, in some embodiments signal processor 450 may find the values for the unknown parameters which minimize the least-square error for the equations. In that case, we can say that signal processor 450 computes an estimated set of values for the unknown parameters which makes the equations approximately true. In other embodiments signal processor 450 may select a different approximation rather than a least-square error, such as one that will minimize the maximum error among the equations, which in general would lead to different values for the unknown parameters.

In some embodiments, signal processor 450 may pre-multiply the linear system with its transpose to create what are referred to as the Normal equations, a matrix of size N×N. In that case, signal processor may apply any of a number of direct solvers, such as LU decomposition, QR factorization, the pseudo-inverse, etc. to the matrix to determine the unknown parameters. Iterative techniques such as Gauss-Seidel, or the Conjugate Gradient method may also be employed. In other embodiments, one of these techniques, or another technique, may operate directly on the original linear system without forming the Normal equations, since forming the Normal equations may greatly reduce accuracy.

In some embodiments, signal processor 450 may employ a direct solver to obtain initial estimates of the values of the unknown parameters, and then as more data is processed may employ an iterative solver to update the estimates.

In some embodiments, signal processor 450 may employ a solver which is customized or tailored to the particular formats of crosstalk filter functions $h_a^H$ and $h_a^L$. For example, if crosstalk filter function $h_a^H$ and/or $h_a^L$ has taps tightly clustered in the center of the filter, then signal processor 450 may employ a direct solver on just those clustered taps to obtain initial estimates of the values of the unknown parameters, and then as more data is processed may employ an iterative solver on all taps of the filter functions to update the estimates.

Once signal processor 450 has determined the estimated parameters or coefficients of crosstalk filter functions $h_a^H$ and $h_a^L$, then signal processor 450 may construct a waveform which represents the crosstalk interference which is added to victim signal 11 from the aggressor signal (supply voltage 15). This is simply the right hand side of equation (10), minus the ISI $h_v * I_v$, which can be constructed by convolution. The magnitude of the constructed waveform represents the magnitude of the crosstalk interference on victim signal 11. As explained above, this can be broken down further into the magnitude of the crosstalk interference on the high bits and the magnitude of the crosstalk interference on the low bits of victim signal 11. Signal processor 450 may then subtract the crosstalk interference waveform from the waveform of victim signal 11 to create a signal waveform which corresponds to victim waveform 11 with cross-talk interference removed therefrom. Display device 460 may then display the signal waveform which corresponds to victim waveform 11 with cross-talk interference removed therefrom.

Figure 5:
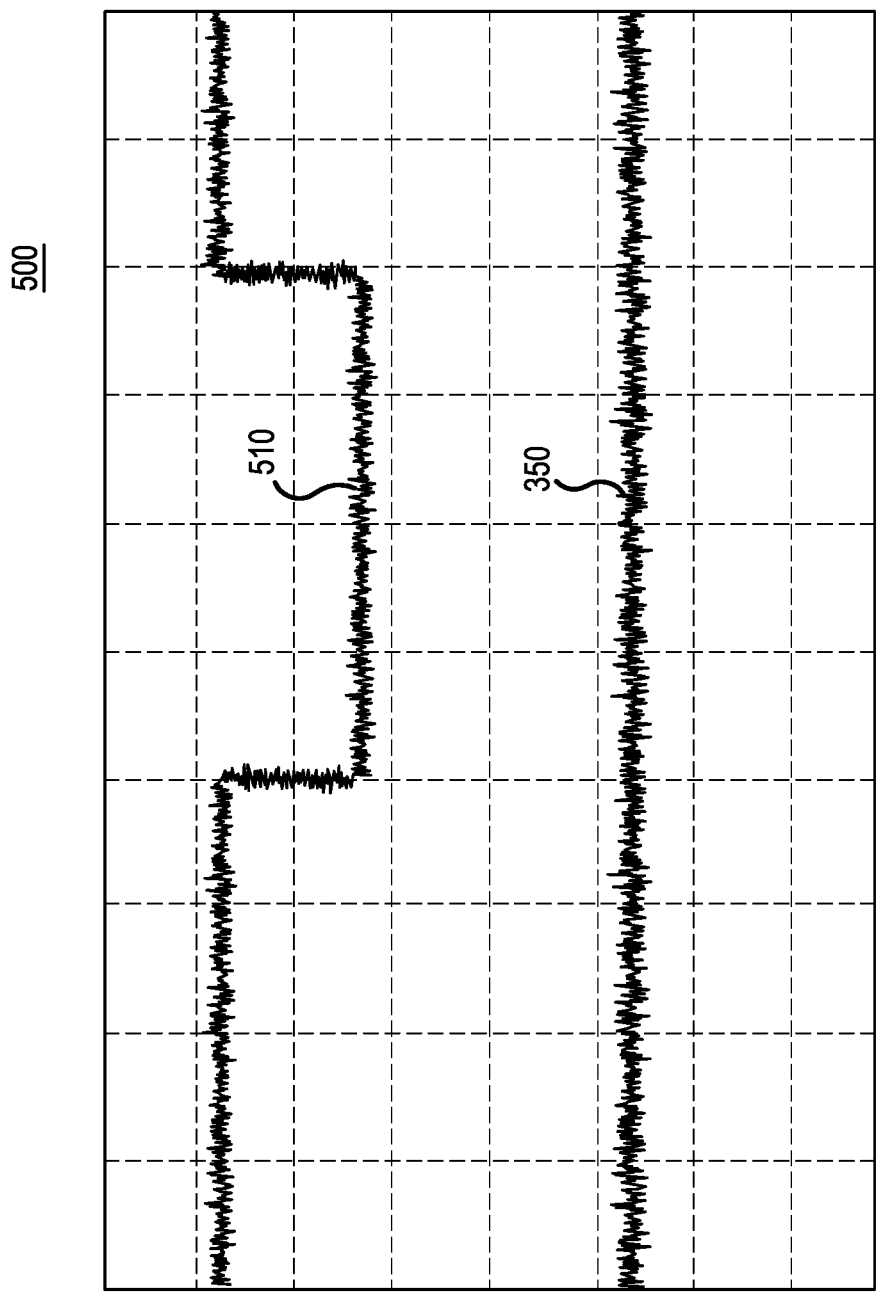
FIG. 5 illustrates a display of an example of the signal waveform and the supply voltage waveform of FIG. 1 where the voltage-dependent power supply crosstalk has been removed from the displayed signal waveform.

FIG. 5 illustrates a display 500 of an example of a signal waveform 510 which corresponds to signal waveform 310 of FIG. 3, with the voltage-dependent power supply crosstalk removed as described above. In this example, it is seen that signal waveform 510 still includes noise, but the noise is reduced compared to signal waveform 310 of FIG. 3.

Figure 6:
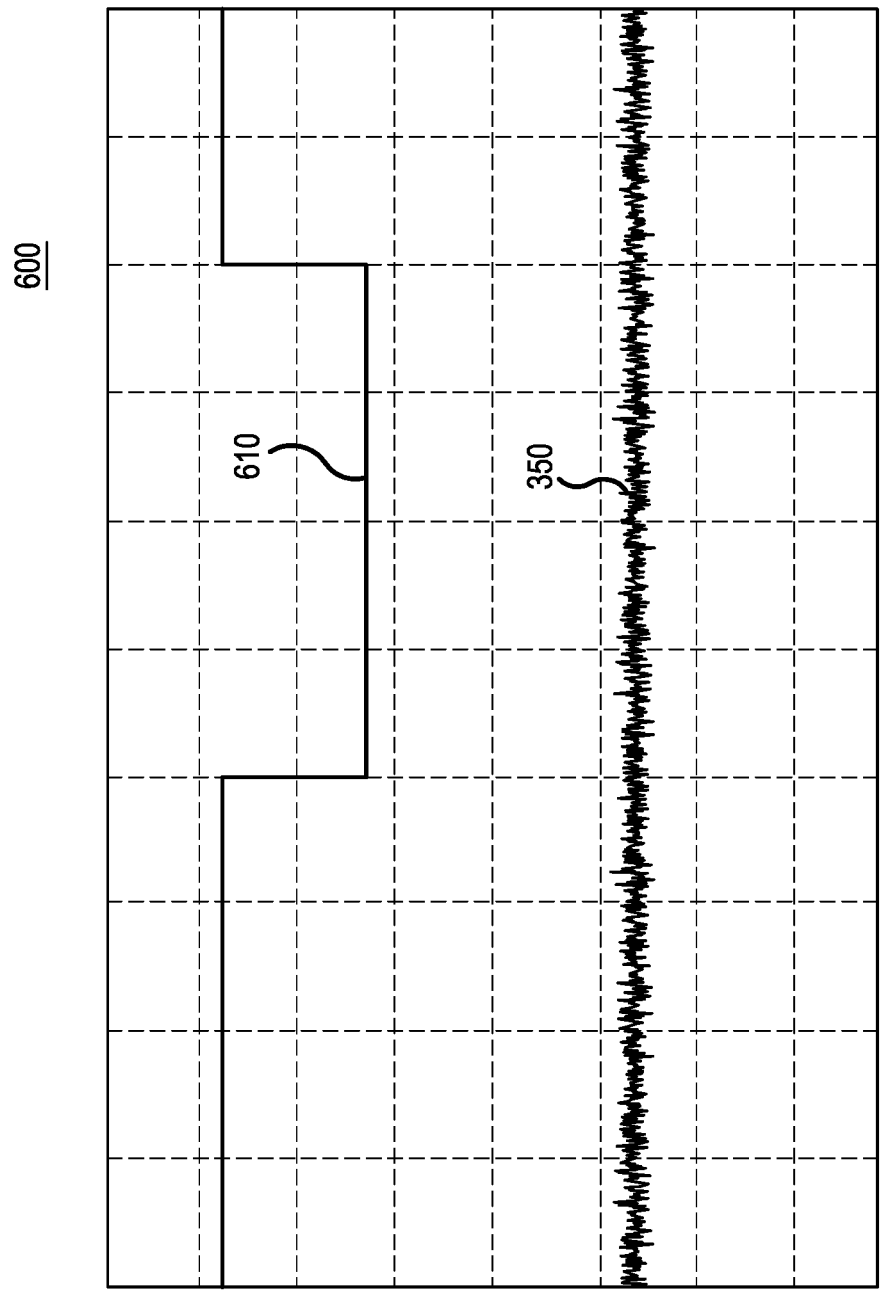
FIG. 6 illustrates a display of another example of the signal waveform and the supply voltage waveform of FIG. 1 where the voltage-dependent power supply crosstalk has been removed from the displayed signal waveform.

FIG. 6 illustrates a display of another example of a signal waveform 610 which corresponds to signal waveform 310 of FIG. 3, with the voltage-dependent power supply crosstalk removed as described above. In this example, it is seen that essentially all of the noise has been removed from signal waveform 610.

In some embodiments, measurement instrument 400 may also display via display device 460 a so-called "eye pattern" of received victim signal 11, as is known by those skilled in the art. In general, the eye pattern may reflect the ideal waveform of victim signal 11 with various error components impressed thereon, including: (1) ISI; (2) crosstalk interference; (3) periodic interference (e.g., from a clock signal of DUT 10); and (4) random and other aperiodic bounded and uncorrelated jitter (ABUJ). Here, however, measurement instrument 400 may allow a user to select, for example from a menu provided to the user via user interface 470, one or more of these error components to be calculated by measurement instrument 400 and removed from received victim signal 11, and the eye pattern may be displayed by display device 460 with the selected error component(s) removed. For example, this may assist a user in ascertaining which components are contributing the greatest interference to "closing the eye" of the eye pattern for victim signal 11.

Figure 7:
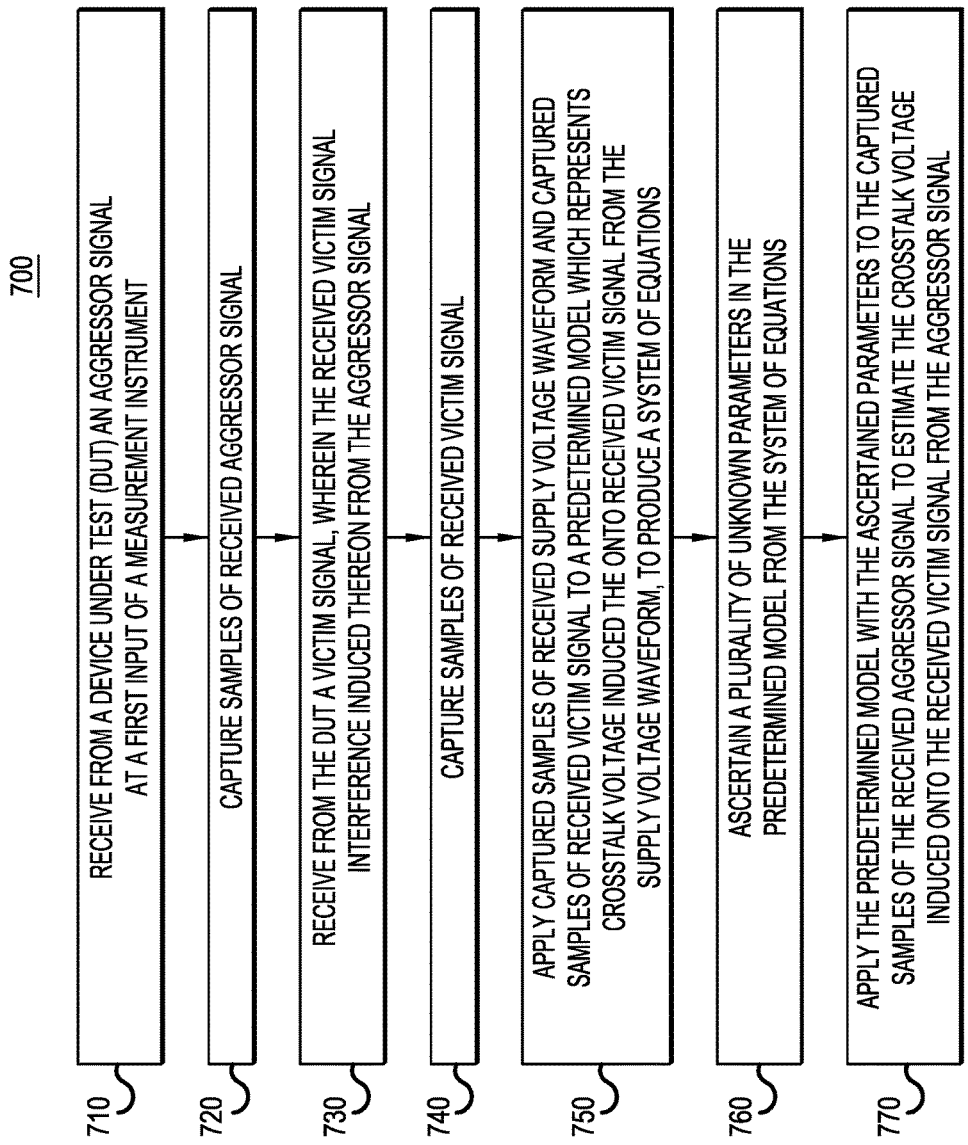
FIG. 7 is a flowchart of an example embodiment of a method of analyzing voltage-dependent crosstalk for a victim signal of a device under test.

Summarizing an example of some of the procedures described above, FIG. 7 is a flowchart of an example embodiment of a method 700 of analyzing voltage-dependent crosstalk (e.g., from a supply voltage) for a victim signal of a device under test which may be performed in whole or in part by measurement instrument 400. Many possibilities for performing method 700 exist and are contemplated within the scope of this disclosure.

In an operation 710, measurement instrument 400 receives supply voltage 15 from device under test (DUT) 10 at first input 410.

In an operation 720, measurement instrument 400 captures samples of received supply voltage 15.

In an operation 730, measurement instrument 400 receives victim signal 11 from DUT 10 at second input 412, wherein the received victim signal includes a crosstalk voltage induced thereon from the supply voltage.

In an operation 740, measurement instrument 400 captures samples of received victim signal 11.

In an operation 750, measurement instrument 400 applies the captured samples of received supply voltage 15 and the captured samples of received victim signal 11 to a predetermined model which represents voltage-dependent power supply crosstalk induced onto received victim signal 11 from supply voltage waveform 15, to produce a system of equations.

In an operation 760, measurement instrument 400 ascertains a plurality of unknown parameters in the predetermined model from the system of equations.

In an operation 770, measurement instrument 400 applies the predetermined model with the ascertained parameters to the captured samples of received supply voltage 15 to estimate the voltage-dependent power supply crosstalk induced onto received victim signal 11 from supply voltage 15.

While example embodiments are disclosed herein, one of ordinary skill in the art appreciates that many variations that are in accordance with the present teachings are possible and remain within the scope of the appended claims. For example, in some cases a measurement instrument may receive and process more than one aggressor signal (e.g., more than one supply voltage) and/or more than one victim signal. In that case, the procedures described herein can be performed with respect to each combination of a particular supply voltage and a particular victim signal to estimate the crosstalk voltage which is induced onto the particular victim signal from the particular supply voltage. The invention therefore is not to be restricted except within the scope of the appended claims.

The invention claimed is:

1. A method, comprising:
a measurement instrument receiving at a first input thereof an aggressor signal from a device under test (DUT);
the measurement instrument receiving at a second input thereof from the DUT a victim signal, wherein the received victim signal includes a crosstalk voltage induced thereon from the aggressor signal;
extracting from the victim signal an ideal data pattern for the received victim signal, where the ideal data pattern does not include intersymbol interference (ISI) and does not include the crosstalk voltage;
ascertaining coefficients for an ISI filter function which transforms the ideal data pattern for the received victim signal into a hypothetical victim signal where the hypothetical victim signal includes ISI but no crosstalk voltage induced thereon, wherein the ascertained coefficients provide the hypothetical victim signal with a best-fit for the received victim signal;
subtracting the hypothetical victim signal from the received victim signal to produce a residual error signal; and
ascertaining coefficients for a crosstalk interference filter function which transforms the received aggressor signal into a crosstalk signal, wherein the determined coefficients provide the crosstalk signal with a best-fit for the residual error signal.

2. The method of claim 1, further comprising applying the crosstalk interference filter function with the ascertained coefficients thereof to the received aggressor signal to estimate crosstalk voltage induced onto the victim signal from the aggressor signal.

3. The method of claim 2, further comprising:
removing from the victim signal at least one of: (1) the ISI, and (2) the estimated crosstalk voltage induced onto the victim signal from the aggressor signal; and
displaying on a display device the victim signal with the at least one of: (1) the ISI, and (2) the estimated crosstalk voltage removed.

4. A method, comprising:
a measurement instrument receiving at a first input thereof an aggressor signal from a device under test (DUT);
the measurement instrument capturing samples of the received aggressor signal waveform;
the measurement instrument receiving at a second input thereof from the DUT a victim signal, wherein the received victim signal includes a crosstalk voltage induced thereon from the aggressor signal;
the measurement instrument capturing samples of the received victim signal;
applying the captured samples of the received aggressor signal and the captured samples of the received victim signal to a predetermined model which represents crosstalk voltage induced onto the received victim signal from the aggressor signal, to produce a system of equations, wherein the model includes a plurality of unknown parameters; and
ascertaining the plurality of unknown parameters in the predetermined model by solving the system of equations produced by applying the captured samples of the received aggressor signal and the captured samples of the received victim signal to the predetermined model which represents crosstalk voltage induced onto the received victim signal from the aggressor signal.

5. The method of claim 4, further comprising applying the predetermined model with the ascertained parameters to the captured samples of the received aggressor signal to estimate the crosstalk voltage.

6. The method of claim 5, further comprising:
removing from the victim signal the estimated crosstalk voltage induced onto the victim signal from the aggressor signal; and
displaying on a display device the victim signal with the estimated crosstalk voltage removed.

7. The method of claim 4, further comprising:
recovering a clock for the victim signal from the captured samples of the received victim signal;
ascertaining intersymbol interference (ISI) in the received victim signal; and
ascertaining the unknown parameters of the predetermined model from the captured samples of the received victim signal, the captured samples of the received aggressor signal, and the ISI in the received victim signal.

8. The method of claim 4, wherein the aggressor signal is a supply voltage of the DUT.

9. The method of claim 8, wherein the predetermined model is:

$$M_v = h_v * [I_v + (h_a^H * (M_A - k)) \cdot Z^H + (h_a^L * (M_A - k)) \cdot Z^L],$$

where: $I_v$ is a vector representing the victim signal with no intersymbol interference (ISI) and no crosstalk voltage from the received supply voltage waveform; $Z^H$ is a vector $(1+I_v)/2$; $Z^L$ is a vector $(1-I_v)/2$; h is an ISI filter function; $h_a^H$ is a crosstalk filter function for high data bits of the received victim signal; $h_a^L$ is a crosstalk filter function for low data bits of the received victim signal; $M_A$ is a vector which represents the captured samples of the supply voltage of the DUT; $M_V$ is a vector which represents the captured samples of the received victim signal; and k is a constant.

10. The method of claim 8, wherein the predetermined model is:

$$M_v = h_v * I_v + h_a^H * (h_V * (M_A \cdot Z^H)) - k^H (h_v * Z^H) + h_a^L * (h_V * (M_A \cdot Z^L)) - k^L (h_v * Z^L)$$

where: $I_v$ is a vector representing the victim signal with no intersymbol interference (ISI) and no crosstalk voltage from the received supply voltage waveform; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the samples of the supply voltage of the DUT; $M_V$ is a vector which represents the captured samples of the received victim signal; and $k^H$ and $k^L$ are constants.

11. The method of claim 8, wherein the unknown parameters include coefficients in: an intersymbol interference (ISI) filter function; a first crosstalk filter function for high data bits of the received victim signal; and a second crosstalk filter function for low data bits in the received victim signal.

12. A measurement instrument, comprising:
   a first input configured to receive at a first input thereof an aggressor signal from a device under test (DUT);
   a first sampler configured to capture samples of the received aggressor signal;
   a second input configured to receive from the DUT a victim signal, wherein the received victim signal includes a crosstalk voltage induced thereon from the aggressor signal;
   a second sampler configured to capture samples of the received victim signal; and
   a signal processor configured to:
      apply the captured samples of the received aggressor signal and the captured samples of the received victim signal to a predetermined model which represents crosstalk voltage induced onto the received victim signal from the received aggressor signal, to produce a system of equations, wherein the model includes a plurality of unknown parameters; and
      ascertain the plurality of unknown parameters in the predetermined model by solving the system of equations produced by applying the captured samples of the received aggressor signal and the captured samples of the received victim signal to the predetermined model which represents crosstalk voltage induced onto the received victim signal from the aggressor signal.

13. The measurement instrument of claim 12, wherein the signal processor is further configured to apply the predetermined model with the ascertained parameters to the captured samples of the aggressor signal to estimate the crosstalk voltage.

14. The measurement instrument of claim 13, further comprising a display device, wherein the signal processor is further configured to remove from the received victim signal the estimated crosstalk voltage induced onto the victim signal from the aggressor signal, and to display via the display device the received victim signal with the estimated crosstalk voltage removed.

15. The measurement instrument of claim 12, wherein the measurement instrument is configured:
   to recover a clock for the victim signal from the captured samples of the received victim signal;
   to ascertain intersymbol interference (ISI) in the received victim signal; and
   to ascertain the unknown parameters of the predetermined model from the captured samples of the received victim signal, the captured samples of the received aggressor signal, and the ISI in the received victim signal.

16. The measurement instrument of claim 12, wherein the aggressor signal is a supply voltage of the DUT.

17. The measurement instrument of claim 16, wherein the predetermined model is:

$$M_v = h_v * [I_v + (h_a^H * (M_A - k)) \cdot Z^H + (h_a^L * (M_A - k)) \cdot Z^L],$$

where: $I_v$ is a vector representing the victim signal with no ISI and no crosstalk voltage from the received supply voltage waveform; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the samples of the supply voltage of the DUT; $M_v$ is a vector which represents the captured samples of the received victim signal; and k is a constant.

18. The measurement instrument of claim 16, wherein the predetermined model is:

$$M_v = h_v * I_v + h_a^H (h_V * (M_A \cdot Z^H)) - k^H (h_v * Z^H) + h_a^L (h_V * (M_A \cdot Z^L)) - k^L (h_v * Z^L),$$

where: $I_v$ is a vector representing the victim signal with no ISI and no crosstalk voltage from the received supply voltage waveform; $Z^H$ is a vector $(1+I_v)/2$; $Z^L$ is a vector $(1-I_v)/2$; $h_v$ is an ISI filter function; $h_a^H$ is a crosstalk filter function for high data bits of the received victim signal; $h_a^L$ is a crosstalk filter function for low data bits of the received victim signal; $M_A$ is a vector which represents the samples of the supply voltage of the DUT; $M_V$ is a vector which represents the captured samples of the received victim signal; and $k^H$ and $k^L$ are constants.

19. The measurement instrument of claim 16, wherein the unknown parameters include coefficients in: an intersymbol interference (ISI) filter function; a first crosstalk filter function for high data bits of the received victim signal; and a second crosstalk filter function for low data bits of the received victim signal.

20. The measurement instrument of claim 12, wherein each equation in the system of equations equates one of the captured samples of the victim signal to a convolution of an intersymbol interference filter function and a crosstalk filter function with a specific set of the captured samples of the aggressor signal.

* * * * *

UNITED STATES PATENT AND TRADEMARK OFFICE
CERTIFICATE OF CORRECTION

PATENT NO. : 10,033,554 B1  
APPLICATION NO. : 15/169189  
DATED : July 24, 2018  
INVENTOR(S) : David L. Gines et al.

Page 1 of 1

It is certified that error appears in the above-identified patent and that said Letters Patent is hereby corrected as shown below:

In Column 22, Line 58, in Claim 9, delete "his" and insert -- $h_v$ is --, therefor.

In Column 23, Line 2, in Claim 10, after "$-k^L(h_v*Z^L)$" insert -- , --.

Signed and Sealed this  
Sixth Day of November, 2018

Andrei Iancu  
*Director of the United States Patent and Trademark Office*